United States Patent [19]
Maruoka

[11] 3,779,015
[45] Dec. 18, 1973

[54] EXHAUST GAS TREATING SYSTEM FOR INTERNAL COMBUSTION ENGINE

[75] Inventor: Hiroyuki Maruoka, Yokohama, Japan

[73] Assignee: Nissan Motor Company, Limited, Kanagawa-ku, Yokohama City, Japan

[22] Filed: Feb. 8, 1972

[21] Appl. No.: 224,518

[30] Foreign Application Priority Data
  Aug. 17, 1971  Japan.............................. 46/62454

[52] U.S. Cl............ 60/286, 60/289, 60/294, 60/300, 23/288 F
[51] Int. Cl............................................. F01n 3/14
[58] Field of Search............... 60/284, 286, 303, 60/289, 294, 300; 23/277 C, 288 F

[56] References Cited
UNITED STATES PATENTS

| | | | |
|---|---|---|---|
| 3,086,353 | 4/1963 | Ridgway | 60/289 |
| 3,203,168 | 8/1965 | Thomas | 60/286 |
| 3,226,206 | 12/1965 | Hettich | 60/286 |
| 3,360,927 | 1/1968 | Cornelius | 60/303 |

FOREIGN PATENTS OR APPLICATIONS

| | | | |
|---|---|---|---|
| 1,308,736 | 10/1962 | France | 60/284 |

*Primary Examiner*—Douglas Hart
*Attorney*—John Lezdey

[57] ABSTRACT

A temperature control system for the catalyst of an exhaust gas afterburner arranged in the exhaust pipe to maintain the reaction temperature within an optimum oxidizing range by blowing heated air through the afterburner when the temperature is below the optimum range and by blowing cool air through the afterburner when the temperature is above the optimum range. Heated air is obtained by burning an air-fuel mixture in a chamber communicating with the exhaust pipe upstream of the afterburner.

4 Claims, 8 Drawing Figures

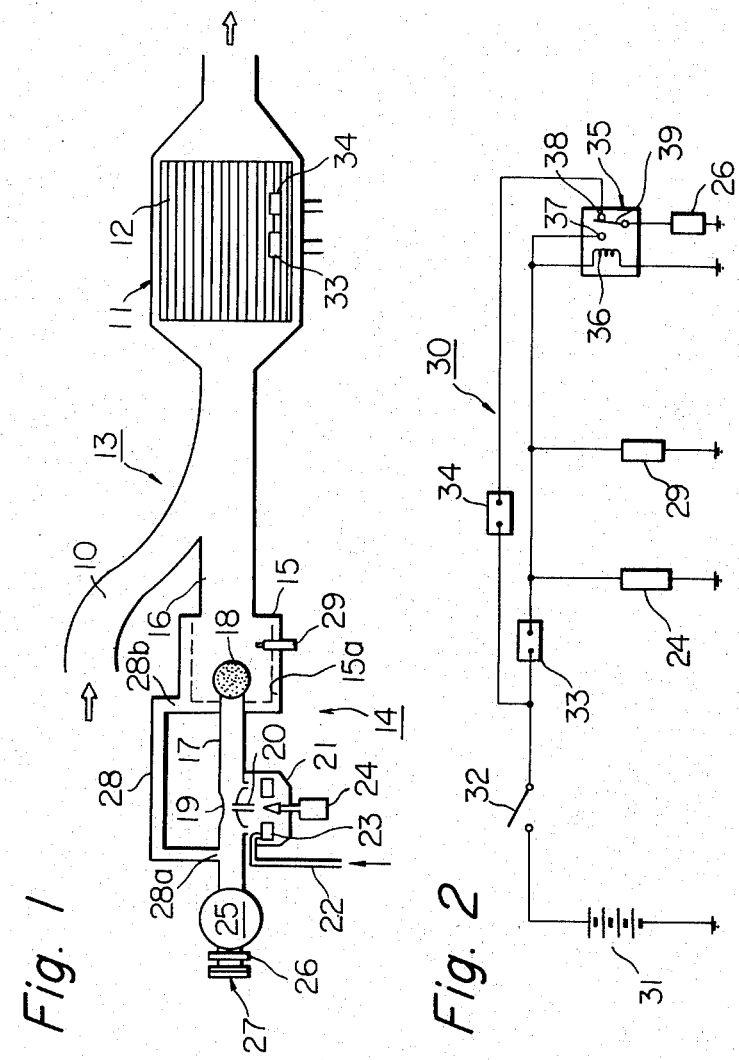

EXHAUST GAS TREATING SYSTEM FOR INTERNAL COMBUSTION ENGINE

This invention relates in general to exhaust gas treating systems for an internal combustion engine and, more particularly, to an exhaust gas treating system for reducing the contents of hydrocarbons, carbon monoxide, and other noxious and harmful components in exhaust gases emitted from the internal combustion engine. The exhaust gas treating system proposed by the present invention is specifically suited for use in the internal combustion engine having an exhaust pipe equipped with a catalytic reactor.

In the operation of a gasoline powered internal combustion engine, a large quantity of unburned gases is discharged into the atmosphere from the exhaust system of the engine. As is well known, such unburned gases contain noxious and harmful components such as hydrocarbons and carbon monoxide, causing serious air pollution especially in urban areas. In order to reduce the noxious and harmful components contained in the engine exhaust gases, various attempts have been made to devise satisfactory catalytic reactors for effecting oxidation of the combustible components such a hydrocarbons and carbon monoxide contained in the engine exhaust gases, but prior to this time, and in spite of these attempts by many individuals, a successful solution of the problem has not been found.

A practical catalytic reactor for motor vehicles should have at least the following five attributes; effectiveness, long life, simplicity, low initial cost, and little, if any, operational expense. None of the catalytic reactors developed in the past have achieved all five of these attributes. Some of them, for instance, have been highly effective in reducing the hydrocarbon and carbon monoxide concentrations in the engine exhaust gases after reaching its operative temperature but because of their design, a considerable time before reaching this operative temperature is required.

The second requirement of long life is important from several standpoints. The life of most catalysts is quite short due to repeated exposure to low and high temperatures, and frequent replacement is accordingly required. An acceptable catalytic reactor must function for a long period of time with little or no maintenance, and ideally with no replacement of the catalyst. The life of such catalytic reactor may depend on the varying operating temperatures thereof and in the past, the catalytic reactors have been operated at a high temperature beyond their operative or effective temperature. Thus it is desirable to control the effective temperature of the catalytic reactor in order to obtain a long period of life.

The third requirement, simplicity, is also important from the points of view of ease of fabrication and installation, low maintenance cost, and freedom from malfunction.

Low initial cost and low operating cost are also desirable. Some of the catalytic reactors which have been proposed in the past require a large quantity of a relatively expensive catalyst for satisfactory combustion. Other catalytic reactors require replacement of catalysts at frequent intervals. The ideal catalytic reactor is one which is effective for a long period of time without requiring frequent replacements of the expensive catalysts.

It is, therefore, an object of the present invention to provide a novel exhaust gas treating system for use with a conventional catalytic reactor mounted in an exhaust pipe of an internal combustion engine.

Another object of the present invention is to provide an exhaust gas treating system adapted for controlling the temperature of the catalyst in the catalytic reactor for thereby eliminating the hydrocarbon and carbon monoxide contents in exhaust gases emitted from the engine in a satisfactory fashion.

A still another object of the present invention is to provide an exhaust gas treating system for effecting fast warm up of the catalyst in the catalytic reactor whereby an operating temperature is rapidly reached to effectively reduce noxious and harmful components in the engine exhaust gases even when the engine is operated at a low temperature.

A still another object of the present invention is to provide an exhaust gas treating system which is capable of maintaining the catalytic reactor associated therewith at its appropriate temperature for a satisfactory combustion throughout the various operating conditions of the engine.

A further object of the present invention is to provide an exhaust gas treating system which is simple in construction, inexpensive to manufacture and easy to install in a motor vehicle.

More specifically, the present invention is directed to an exhaust gas treating system which includes the following essential features:

1. An operating temperature of the catalyst in the catalytic reactor is rapidly reached so that the device operates effectively to reduce noxious and harmful components in the engine exhaust gases. A large amount of thermal energy can be used to help combustion of the unburned hydrocarbons and carbon monoxide in the engine exhaust gases before entering the catalytic reactor and, as a result, the noxious and harmful components in the engine exhaust gases are significantly reduced.

2. Air can be introduced into the catalytic reactor for thereby cooling the same. This feature is especially advantageous in that, by heating and cooling processes, the temperature of the catalyst of the catalytic reactor can be continuously maintained within a limited appropriate range to increase the durability of the same.

3. Since the temperature of the catalyst can be readily controlled, the present system can be installed in any suitable part of the motor vehicle without difficulty.

4. The above features show that it is possible to use a relatively inexpensive catalyst in the catalytic reactor to provide a low initial cost and low operating cost.

5. The temperature of the catalyst can be maintained at a relatively low level in respect of the amount of the exhaust gases by supplying air into the exhaust pipe of the engine and such supply of air to the exhaust pipe will be reflected by a satisfactory combustion of the unburned gases so that the amounts of noxious and harmful components therein are considerably decreased to reduce air pollution during acceleration of the engine.

In general, these objects and features of the present invention are achieved in an exhaust gas treating system adapted for controlling the temperature of the catalyst in a catalytic reactor disposed in an exhaust pipe of an internal combustion engine. The exhaust gas treating system includes a burner unit provided upstream of the catalytic reactor located in the exhaust pipe. In a preferred embodiment, the burner unit includes a burner chamber communicating with the exhaust pipe upstream of the catalytic reactor for supplying a proper amount of air at high temperature to the catalytic reactor to effect fast warm up of the same when combustion of an air-fuel mixture takes place in the burner chamber. The burner chamber has an ignition means adjacent a diffusing member leading from an air-fuel mixture supply passage. The air-fuel mixture supply passage has a venturi portion which is provided with a nozzle for admitting fuel into the air-fuel mixture supply passage. This nozzle is associated with a fuel shut-off valve which is arranged to normally shut off the fuel supply into the air-fuel mixture supply passage. The burner unit also includes an air pump which communicates with the air-fuel mixture supply passage upstream of the venturi portion for forcibly supplying air into the air-fuel mixture supply passage. A by-pass passage is provided which communicates with the air-fuel mixture supply passage upstream of the venturi portion thereof and also communicates with the burner chamber for supplying the air thereinto. The exhaust gas treating system further includes a control circuit which is arranged to control the air pump, the fuel shut-off valve and the ignition means in a manner to control the temperature of the air to be supplied to the catalytic reactor disposed in the exhaust pipe of the engine. In a preferred example, the control circuit consists of a d.c. voltage source, an ignition switch for the engine and connected to the d.c. voltage source, first and second thermostatic switches connected in parallel to the d.c. voltage source through the ignition switch, and a relay means. The relay means includes first and second stationary contacts connected to the d.c. voltage source through the first and second thermostatic switches, respectively, a relay coil connected to the first thermostatic switch, and an arm associated with the relay coil. The relay means is operatively connected to an electro-magnetic clutch for actuating the air pump which is controlled by the first and second thermostatic switches. The fuel shut-off valve and the ignition means are connected to the first thermostatic switch and controlled thereby. The first thermostatic switch is closed when the temperature of the catalyst in the catalytic reactor is below a predetermined range so that the air pump, the fuel shut-off valve and the ignition means are energized. As a result, the air-fuel mixture is supplied to the burner chamber in which combustion of the same is initiated by a spark of the ignition means. The second thermostatic switch is closed while the first thermostatic switch is opened when the temperature of the catalyst is beyond the predetermined range so that the fuel shut-off valve and the ignition means are de-energized while the air pump is actuated. Consequently, only the air is supplied to the burner chamber through which it is delivered to the catalytic reactor for thereby cooling the catalyst. When the temperature of the catalyst is within the predetermined range, both the first and second thermostatic switches are opened so that the air pump, the fuel shut-off valve and the ignition means are de-energized and thus the burner unit is made inoperative during this time period for thereby maintaining the catalyst at a suitable temperature to reduce air pollution. In another preferred example, the control circuit includes, in addition to the d.c. voltage source, a key switch, means for sensing acceleration of the engine, a timing device connected to the d.c. voltage source through the key switch and connected to the acceleration sensing means for producing a signal, means for sensing the temperature of the catalyst of the catalytic reactor for producing a signal when the temperature of the catalyst reaches an excessive level to cause damage to the catalyst, and a logic circuit connected to the timing device and the temperature sensitive means for producing output signals for controlling the electro-magnetic clutch, the fuel shut-off valve and the ignition means. When the key switch is closed during cold engine operation or when the acceleration sensing means detects acceleration of the engine, the logic circuit functions to generate output signals for actuating the air pump, the fuel shut-off valve and the ignition means so that the combustion of the air-fuel mixture takes place in the burner chamber. After a certain time interval, the timing device generates a signal to cause the logic circuit to produce a second output signal for rendering the air pump, the fuel shut-off valve and the ignition means inoperative. If, however, the temperature sensitive means detects an excessive temperature of the catalyst, then the logic circuit generates a third output signal to actuate only the air pump so that the air introduced into the burner chamber is directly delivered to the catalytic reactor for thereby cooling the catalyst therein.

These and other objects, features, and advantages of the present invention will become more apparent from the following description when taken in conjunction with the accompanying drawings, in which:

FIG. 1 is a diagrammatic side elevational view of an exhaust gas treating system according to the present invention and its associated catalytic reactor;

FIG. 2 is a schematic view of a preferred example of a control circuit for use in the exhaust gas treating system shown in FIG. 1;

Figure 5A:
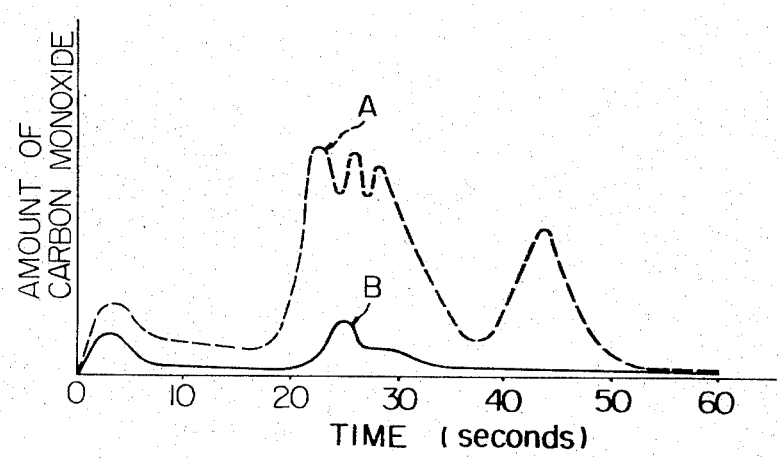
Figure 5B:
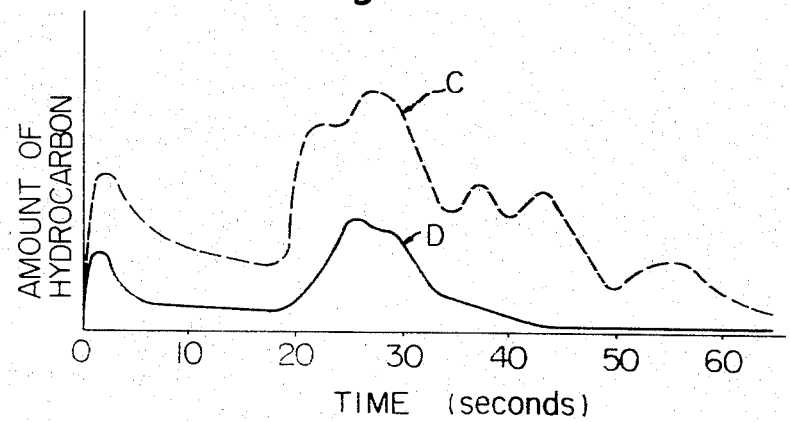
Figure 6A:
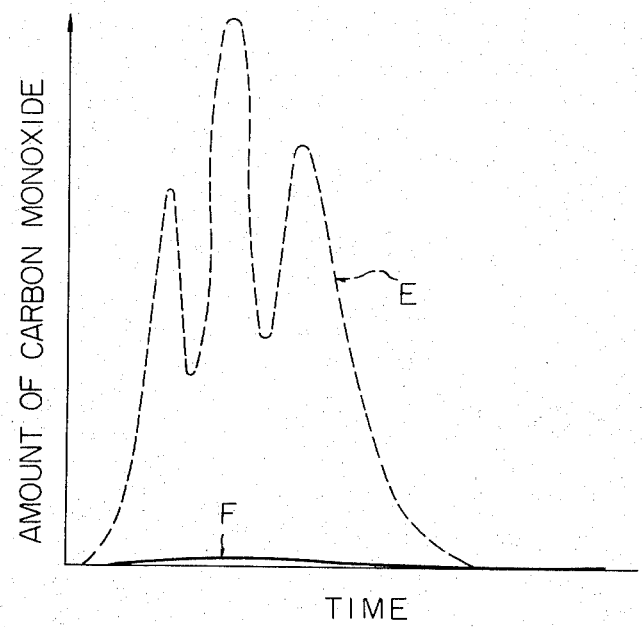
Figure 6B:
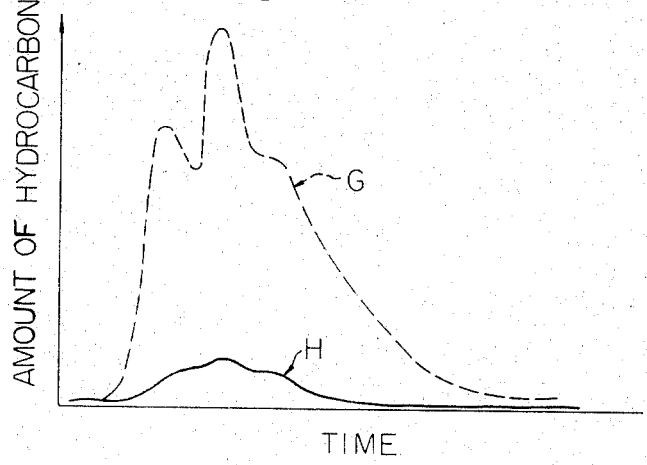

FIGS. 5A and 5B are graphical representations of the amounts of carbon monoxide and hydrocarbons contained in the engine exhaust gases during starting or warm up of the engine which are obtained with the use of the exhaust gas treating system of the present invention; and FIGS. 6A and 6B are graphical representations of the amounts of carbon monoxide and hydrocarbons contained in the engine exhaust gases during acceleration of the engine.

Referring now to the drawings and more particularly to FIG. 1, there is diagrammatically shown an exhaust gas treating system of the present invention which may be installed in a conventional internal combustion engine. As seen from FIG. 1, the internal combustion engine is ordinarily provided with an exhaust pipe 10 in which a catalytic reactor 11 is incorporated. The catalytic reactor 11 may be of any known construction and has a catalyst 12 therein for purifying the exhaust gases released from the internal combustion engine (not shown). The present system, generally indicated by reference numeral 13, is provided upstream of the catalytic reactor 11 so that the effective temperature of the catalyst 12 is controlled throughout the various operating conditions of the engine.

The present system 13 consists of a burner unit which is generally indicated at 14. The burner unit 14 includes a burner chamber 15 which is in communication with the exhaust pipe 10 upstream of the catalytic reactor 11 through a duct 16. The burner unit 14 also includes an air-fuel mixture supply passage 17 which is provided with a diffusing member 18 disposed in the burner chamber 15. The air-fuel mixture supply passage 17 has a venturi portion or throat portion 19 which is provided with a nozzle 20.

The nozzle 20 communicates with a float chamber 21, which is connected to a fuel tank (not shown) of the engine by means of a conduit 22. The float chamber 21 has an annular float 23 which controls the supply of fuel into the float chamber 21 through the conduit 22 and maintains the fuel in the float chamber 21 at a constant level.

Indicated at 24 is a fuel shut-off valve which is associated with the nozzle 20 for selectively shut off the fuel from being admitted to the venturi portion 19 of the air-fuel mixture supply passage 17 when it is deenergized.

The burner unit 14 also includes an air pump 25, which communicates with the air-fuel supply passage 17 upstream of the venturi portion 19 for forcibly supplying air thereinto. The air pump 25 is actuated by an electro magnetic clutch 26, through which the air pump 25 is connected to a pulley 27. The pulley 27 may be connected to and driven by the engine.

As shown in FIG. 1, a by-pass passage 28 is also provided in the burner unit 14. The by-pass passage 28 has an inlet 28a which intersects the air-fuel mixture supply passage 17 between the air pump 25 and the venturi portion 19, and an outlet 28b communicating with the burner chamber 15 through a perforated inner wall portion 15a.

An ignition means 29 is disposed in the burner chamber 15 for effecting combustion of an air-fuel mixture flowing through the diffusing member 18 so that the heated air is delivered through the duct 16 to the catalytic reactor 11 for effecting fast warm up of the catalyst 12.

From the description given hereinabove, it will be observed that the air from the air pump 25 passes into the by-pass passage 28 through which it enters the burner chamber 15, while the air also passes into the air-fuel mixture supply passage 17. As the air passes through the venturi portion 19 of the air-fuel mixture supply passage 17, subatmospheric pressure prevails therearound so that the fuel is sucked through the nozzle 20 into the venturi portion 19 due to the pressure difference. The fuel thus admitted into the venturi portion 19 is mixed with the air passing therethrough into a suitable mixture which is allowed into the burner chamber 15 through the diffusing member 18. This mixture is ignited by the ignition means 29 in the burner chamber 15 so that combustion will take place. The air thus heated in the burner chamber 15 is then delivered through the duct 16 to the exhaust pipe 10 upstream of the catalytic reactor 11 with a result that not only the exhaust gases are heated to a temperature for satisfactory combustion but also the effective or operative temperature of the catalyst 12 will be rapidly reached to effectively reduce the hydrocarbon and carbon monoxide contents in the engine exhaust gases.

In order to control the operations of the air pump 25, the shut-off valve 24 and the ignition means 29, the exhaust gas treating system 13 further includes a control circuit which is shown in detail in FIG. 2. The control circuit, generally designated by reference numerical 30, includes a d.c. voltage source or battery 31, which is connected to an ignition switch 32 for the internal combustion engine. The control circuit 30 also includes first and second thermostatic switches 33 and 34 which are connected in parallel to the d.c. voltage source 31 through the ignition switch 32.

Figure 3:
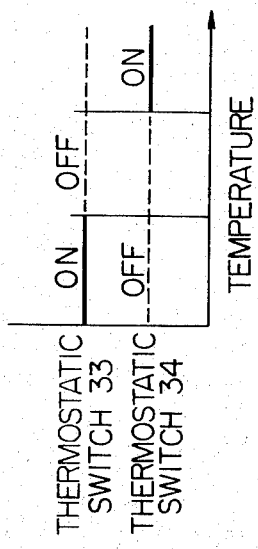
FIG. 3 is a schedule illustrating operating characteristics of the first and second thermostatic switches used in the control circuit of FIG. 2.

As seen from FIG. 1, the first and second thermostatic switches 33 and 34 are disposed in and attached to the catalyst 12 of the catalytic reactor 11. The first thermostatic switch 33 is arranged to be closed when the temperature of the catalyst 12 is below a lower limit of a predetermined range, for instance, between 500° – 650°C (See FIG. 3). On the other hand, the second thermostatic switch 34 is arranged to be closed when the temperature of the catalyst 12 exceeds an upper limit of the predetermined range, for instance, between 500° – 650°C (See FIG. 3). The fuel shut-off valve 24 and the ignition means 29 are connected to the d.c. voltage source 31 through the first thermostatic switch 33 and controlled thereby.

The control circuit 30 further includes a relay switch 35, which includes a relay coil 36 connected in series to the d.c. voltage source 31 through the first thermostatic switch 33 and the ignition switch 32. The relay switch 35 also includes first and second stationary contacts 37 and 38 which are connected to the first and second thermostatic switches 33 and 34, respectively. The relay switch 35 further includes an arm 39 which is switchable between the first and second stationary contacts 37 and 38 and which is connected to the electro-magnetic clutch 26 associated with the air pump 25 (see FIG. 1).

Before entering into detailed discussion of the operation of the control circuit of FIG. 2, let it be assumed that the ignition switch 32 is closed for starting the engine. Moreover, the operation of the control circuit 30 will be herein described in connection with the burner unit 14 associated therewith for the sake of facilitating the understanding of the present invention. When, now, the temperature of the catalyst 12 of the catalytic reactor 11 is below the lower limit, for instance 500°C of the predetermined range, the first thermostatic switch 33 is closed whereas the second thermostatic switch 34 is opened. Consequently, an electric current flow path is established between the d.c. voltage source 31 and the lead connected to the fuel shut-off valve 24, the ignition means 29, and the relay coil 36 of the relay switch 35. As the relay coil 36 is energized, then the arm 39 is moved counterclockwise so that the arm 39 engages the first stationary contact 37 to energize the electro-magnetic clutch 26. Under these circumstances, the air pump 25 is operated by the electromagnetic clutch 26 to forcibly supply air into the air-fuel mixture supply passage 17 and the by-pass passage 28. The air supplied to the air-fuel mixture supply passage 17 passes through the venturi portion 19 to create a subatmospheric pressure therearound so that fuel in the float chamber 21 is sucked into the venturi portion 19 through the nozzle 20 and is mixed with the air passing therethrough. This air-fuel mixture is then passed through the diffusing member 18 into the burner chamber 15. Since, in this condition, the ignition means 29 is energized by the control circuit 30, the air-fuel mixture in the burner chamber 15 is ignited to effect combustion therein. Thus, the air in the burner chamber 15 is heated to a high temperature and the heated air is then delivered to the exhaust pipe 10 of the engine upstream of the catalytic reactor 11. As a consequence, the catalyst 12 is rapidly warmed up to effect purifying of the engine exhaust gases for thereby decreasing the amounts of noxious and harmful components therein. It will be appreciated that the heated air introduced into the exhaust pipe 10 functions to facilitate the oxidization of the unburned hydrocarbons and carbon monoxide contained in the engine exhaust gases and, therefore, the noxious and harmful components are considerably eliminated.

Upon increase in the temperature of the catalyst 12, as for example, to the temperature range of 500°C to 650°C both of the first and second thermostatic switches 33 and 34 are opened so that the electric current flow path is cut off between the d.c. voltage source 31 and the lead connected to the electro-magnetic clutch 26, fuel shut-off valve 24 and the ignition means 29. Thus, the burner unit 14 is rendered inoperative to maintain the catalyst 12 at a temperature appropriate for burning the noxious and harmful components in the engine exhaust gases as previously discussed.

Upon a further increase in the temperature of the catalyst 12 to temperatures of above 650°C during high speed operating or accelerating conditions of the engine, the second thermostatic switch 34 is closed with the first thermostatic switch 33 kept opened. Consequently, the electric current flow passage is established between the d.c. voltage source 31 and the second stationary contact 38 of the relay switch 35, whereas the electric current flow passage is interrupted between the d.c. voltage source 31 and the lead connected to the fuel shut-off valve 24 and the ignition means 29 which are consequently de-energized. With the thermostatic switch 33 being opened, the relay coil 36 is de-energized so that the arm 39 engages the second stationary contact 38 to energize the electro-magnetic clutch 26. With the electro-magnetic clutch 26 being energized, the air pump 25 is actuated to forcibly supply air into the air-fuel mixture supply passage 17 and to the bypass passage 28, through which the air is passed into the burner chamber 15. Since, in this condition, the fuel shut-off valve 24 and the ignition means 29 are de-energized air-fuel mixture is not supplied to the burner chamber 15 and thus no combustion will take place. Accordingly, the air introduced into the burner chamber 15 is delivered to the catalytic reactor 11 for thereby decreasing the temperature of the catalyst 12 to a suitable level. Thus, the temperature of the catalyst 12 of the catalytic reactor 11 is maintained within a suitable range between, for example, 500° – 650°C throughout the various operating conditions of the engine so that not only the air pollution is significantly reduced but also the life of the catalyst 12 is prolonged.

Figure 4:
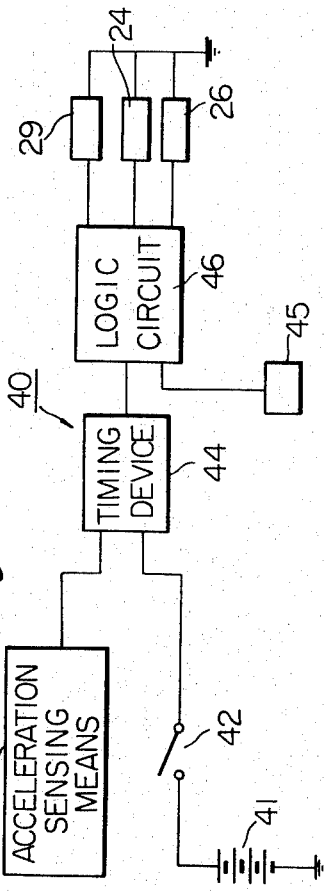
FIG. 4 is a schematic view of another preferred example of the control circuit for use in the exhaust gas treating system shown in FIG. 1.

FIG. 4 illustrates another example of the control circuit which can be associated with the burner unit forming part of the exhaust gas treating system of the present invention. In the illustrated embodiment of FIG. 4, the control circuit which is generally indicated at 40 includes a d.c. voltage source 41, a key switch 42, a sensing means 43 for sensing acceleration of the engine, a timing device 44 connected to the d.c. voltage source 41 through the key switch 42 and connected to the sensing means 43, a temperature sensing means 45, and a logic circuit 46 connected to the timing device 44 and the temperature sensing means 45.

The acceleration sensing means 43, whch may be of any known construction, is attached to an accelerator pedal (not shown) to sense a position of the accelerator pedal for thereby producing a signal when the accelerator pedal is depressed, the signal being applied to the timing device 44. The timing device 44 may be of any conventional construction insofar as it functions to produce signals at present instants of time. The signals from the timing device 44 are applied to the logic circuit 46, to which a signal from the temperature sensing means 45 is also applied. The temperature sensing means 45 is provided in the catalytic reactor 11 (see FIG. 1) in a manner to sense the temperature of the catalyst therein for producing the signal when the temperature of the catalyst exceeds an excessive level. The logic circuit 46 may be arranged in a usual manner to produce first, second, third and fourth output signals in response to the input signals applied thereto for theregy controlling the operations of the ignition means 29, the fuel shut-off valve 24 and the electromagnetic clutch 26.

When, in operation, the key switch 42 is closed, the timing device 44 is actuated to produce a signal, which is applied to the logic circuit 46. Upon receiving this input signal, the logic circuit 46 functions to produce a first output signal to energize the ignition means 29, the fuel shut-off valve 24 and the electromagnetic clutch 26. After a certain time interval, the timing device 44 produces a signal which is applied to the logic circuit 46. Upon receiving this input signal, the logic circuit 46 produces a second output signal for rendering the ignition means 29, the fuel shut-off valve 24 and the electro-magnetic valve 26 inoperative so that the burner unit is maintained in its inoperative condition. If, however, the temperature sensing means 45 detects an excessive temperature of the catalyst to produce a corresponding signal, then the logic circuit 46 functions to produce a third output signal to energize only the electro-magnetic clutch 26 so that only the air pump is actuated. Thus, air is delivered to the exhaust pipe upstream of the catalytic reactor and serves to decrease the temperature of the catalyst to a proper level. The supply of air to the exhaust pipe is advantageous in that the unburned gases contained in the exhaust gases emitted from the engine are satisfactorily burned or oxidized to reduce noxious and harmful components in the exhaust gases. This is quite beneficial especially when the engine is operated at an accelerating condition because of the fact that, during acceleration of the engine, the amount of the exhaust gases increases thereby to increase a space velocity (the amount of exhaust gases capacity of the catalyst) with a resultant decrease in reaction time of the exhaust gases by the catalyst. When, moreover, the acceleration sensing means 43 detects the accelerating condition of the engine for producing the signal corresponding thereto, this signal is applied through the timing device 44 to the logic circuit 46. Then, the logic circuit 46 produces a fourth output signal for energizing the ignition means 29, the fuel shut-off valve 24 and the electro-magnetic clutch 26 for a certain time interval.

FIGS. 5A and 5B are graphs showing the relationships between the amount of carbon monoxide and time and between the amount of hydrocarbon and time, respectively, the amounts of these components being measured in the exhaust gases emitted from the engine which is operating at a low temperature. In FIG. 5A, the curve A indicates the amount of carbon monoxide contained in the exhaust gases where the exhaust gas treating system of the present invention is maintained in its inoperative condition, while the curve B represents the case where the present system is operated. In FIG. 5B, the curve C designates the amount of the hydrocarbon contained in the exhaust gases where the present system is rendered inoperative, and the curve D shows the case where the present system is operated. It will thus be seen that the amounts of these noxious and harmful components in the exhaust gases are significantly reduced with the use of the present system even when the engine is operated at a low temperature.

FIGS. 6A and 6B are graphs showing the relationship between the amount of carbon monoxide and time and between the amount of hydrocarbon and time, the amounts of these components being measured in the exhaust gases emitted from the engine which is operated at a warmed up condition. In FIGS. 6A and 6B, the curve E designates the amount of carbon monoxide in the exhaust gases where the present system is maintained in its inoperative condition, while the curve F indicates the case where the present system is maintained in its operative condition. Likewise, the curve G represents the amount of the hydrocarbon contained in the exhaust gases where the present system is maintained in its inoperative condition, while the curve H indicates the case where the present system is maintained in its operative condition. It will also be appreciated that the hydrocarbon and carbon monoxide contents in the exhaust gases are considerably reduced with the use of the present system when the engine is operated at a high temperature.

It will now be understood that the exhaust gas treating system of the present invention is advantageously combined with the conventional catalytic reactor for thereby eliminating noxious and harmful components in the engine exhaust gases in a satisfactory fashion.

What is claimed is:

1. An exhaust gas treating system for an internal combustion engine having an exhaust pipe and a catalytic reactor, having a catalyst therein, disposed in said exhaust pipe for oxidizing engine exhaust gases passing therethrough, said system comprising a burner chamber communicating with said exhaust pipe upstream of said catalytic reactor, ignition means disposed in said burner chamber for effecting combustion of an air-fuel mixture supplied thereto, an air-fuel mixture supply passage communicating with said burner chamber for supplying said burner chamber with said air-fuel mixture, said air-fuel mixture supply passage having a venturi portion provided with a nozzle communicating with a float chamber, an air pump communicating with said air-fuel mixture supply passage and driven through an electro-magnetic clutch for forcibly supplying air thereinto, a by-pass passage having an inlet intersecting said air-fuel mixture supply passage between said air pump and said venturi portion and an outlet communicating with said burner chamber, a fuel shut-off valve associated with said nozzle for selectively shutting off the supply of fuel into said air-fuel mixture supply passage, and a control circuit for controlling the operations of said electromagnetic clutch, said fuel shut-off valve and said ignition means for controlling the temperature of said air to be delivered to said catalytic reactor, said control circuit including a d.c. voltage source, an ignition switch connected to said d.c. voltage source, first and second thermostatic switches connected in parallel to said d.c. voltage source through said ignition switch, said first thermostatic switch being connected to said fuel shut-off valve and said ignition means, and a relay including first and second stationary contacts connected to said d.c. voltage source through said first and second thermostatic switches respectively, a solenoid coil connected to said first thermostatic switch, and a movable contact associated with said solenoid coil and connected to said electromagnetic clutch, said first thermostatic switch being closed to energize said fuel shut-off valve, said ignition means and said electro-magnetic clutch for effecting combustion of said air-fuel mixture supplied to said burner chamber to heat the air to be delivered to said exhaust pipe upstream of said catalytic reactor when said temperature of said catalyst is below a lower limit of a predetermined range, said second thermostatic switch being closed to energize only said electromagnetic clutch for supplying said air into said catalytic reactor through said burner chamber for thereby decreasing the temperature of said catalyst when said temperature of said catalyst is beyond an upper limit of said predetermined range, and said first and second thermostatic switches being simultaneously opened to de-energize said fuel shut-off valve, said ignition means and said electro-magnetic clutch when said temperature of said catalyst is within said predetermined range.

2. An exhaust gas treating system according to claim 1, wherein said predetermined range is between 500° and 650°C.

3. An exhaust gas treating system for an internal combustion engine having an exhaust pipe and a catalytic reactor disposed in said exhaust pipe for oxidizing engine exhaust gases passing therethrough, said system comprising a burner chamber communicating with said exhaust pipe upstream of said catalytic reactor, ignition means disposed in said burner chamber for effecting combustion of an air-fuel mixture supplied thereto, an air-fuel mixture supply passage communicating with said burner chamber for supplying said burner chamber with said air-fuel mixture, said air-fuel mixture supply passage having a venturi portion provided with a nozzle communicating with a float chamber, an air pump communicating with said air-fuel mixture supply passage and driven through an electro-magnetic clutch for forcibly supplying air thereinto, a by-pass passage having an inlet intersecting said air-fuel mixture supply passage between said air pump and said venturi portion and an outlet communicating with said burner chamber, a fuel shut-off valve associated with said nozzle or selectively shutting off the supply of fuel into said air-fuel mixture supply passage, and a control circuit for controlling the operations of said electro-magnetic clutch, said fuel shut-off valve and said ignition means for controlling the temperature of said air to be delivered to said catalytic reactor, said control circuit including a d.c. voltage source, a key switch connected to said d.c. voltage source, means for sensing acceleration of said engine, a timing device connected to said d.c. voltage source through said key switch and to said sensing means, means for sensing the temperature of said catalyst for producing a signal when said temperature of said catalyst reaches an excessive level, and a logic circuit connected to said timing device and said last-named sensing means for producing output signals in response to the input signals applied thereto, said logic circuit being connected to fuel shut-off valve, said ignition means and said electro-magnetic clutch.

4. An exhaust gas treating system according to claim 3, wherein said timing device produces signals at preset instants of time, said signals being supplied to said logic circuit.

* * * * *